March 19, 1963 K. JAKOBS ET AL 3,081,877
FILTER NOZZLE
Filed Aug. 19, 1958
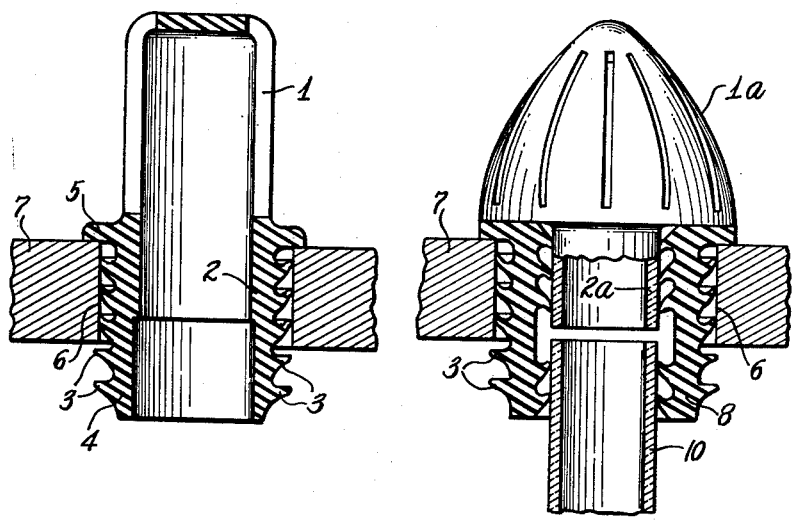
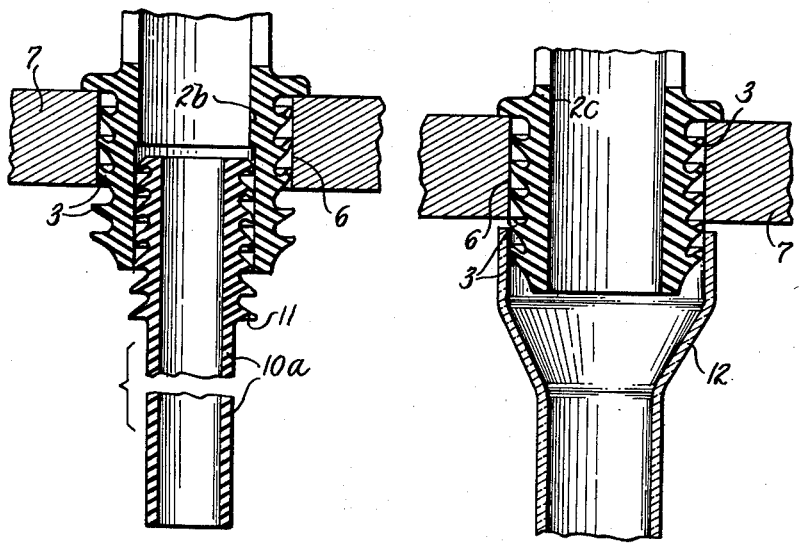
INVENTORS
Karl Jakobs
Friedrich-Karl Ludwigs
By
Patent Agent

United States Patent Office 3,081,877
Patented Mar. 19, 1963

3,081,877
FILTER NOZZLE
Karl Jakobs and Friedrich-Karl Ludwigs, Gummersbach, Rhineland, Germany, assignors to L. & C. Steinmuller Gesellschaft mit beschrankter Haftung, Gummersbach, Rhineland, Germany
Filed Aug. 19, 1958, Ser. No. 756,045
Claims priority, application Germany Aug. 20, 1957
2 Claims. (Cl. 210—293)

The present invention relates to a nozzle for liquid filters filled with granular filter material. With liquid filters of this type, it is customary to equip the filter bottom supporting the filter material with a plurality of nozzle bodies. This was done heretofore by either providing the nozzles with a threaded shank and screwing said shanks into threaded bores of said bottom, or the nozzle shanks provided with a thread were passed through said bottom and were secured on said bottom by screwing a nut from the other side of the bottom onto said shank. These designs, however, require in addition to the shank thread that either the bores in the bottom are provided with a thread or it was necessary in order to place the nuts on the threaded shank part below the bottom, to be able to accede to the space below said bottom.

It is, therefore, an object of the present invention to provide a filter nozzle arrangement which will overcome the above mentioned drawbacks.

It is another object of this invention to provide a filter nozzle arrangement which will make it possible firmly to secure the nozzles to the filter bottom without employing threads and/or nuts.

It is also an object of this invention to provide a nozzle arrangement of the type set forth in the preceding paragraph which will be simple in production and highly economical in use.

These and other objects and advantages of the invention will appear more clearly from the following specification in connection with the accompanying drawing, in which:

FIG. 1 is a section through a filter nozzle arrangement according to the present invention, in which the nozzle shank is gilled or ribbed, said gills or ribs being integral with said shank.

FIG. 2 represents a section through a modified nozzle arrangement according to the invention with a gilled or ribbed sleeve intermediate the nozzle and the bottom of the filter.

FIG. 3 represents a filter nozzle arrangement of the type shown in FIG. 1 but with an immersion tube inserted thereinto.

FIG. 4 is a section through a nozzle arrangement somewhat similar to that of FIG. 1 but with extended shank and clamped-on immersion tube.

General Arrangement

The nozzle arrangement according to the present invention is characterized primarily in that the nozzle body is directly or indirectly connected with the filter bottom and if desired with an immersion tube by means of a plurality of elastic parallel annular ribs or gills arranged one behind the other when viewed in the axial displacement direction of said ribs. The said ribs or gills are firmly connected to two cylindrical parts directly to be connected to each other and are so designed that when axially telescoping the said two cylindrical parts, said ribs or gills on one part will be elastically pressed against the smooth wall of the other part. This means of connection replaces the heretofore customary screw connections which require outer and inner threads on each of the two cylindrical parts to be connected directly with each other.

According to one embodiment of the invention, the nozzle shank extending through the bottom of the filter has its cylindrical outer wall equipped with annular ribs or gills the peripheral free edges of which are adapted to clamp firmly against the smooth inner wall of the nozzle hole in the filter bottom or the immersion tube.

The annular ribs or gills are advantageously unilaterally reinforced at the base portions thereof, especially on that side which when inserting the nozzles will be the front side. In this way, the resistance against axial displacement in one direction namely in the direction of insertion of the nozzles, will be considerably less than when forcing the nozzles in the opposite direction for removal thereof. For purposes of pressing the nozzles into the filter bottom, only a minor force has to be employed whereas when removing the nozzles, considerably greater forces must be used.

The nozzle body and the shank with the annular ribs or gills may be integral with each other, i.e. may be an undivided entirety of the same soft elastic material such as thermoplastic synthetic material for instance polyethylene.

However, it is also possible to produce the nozzles as heretofore from the customary, particularly ceramic materials and to make merely the shank of elastic material. Preferably, the shank may be made as a separate nipple or sleevelike intermediate member which is to be connected to the bottom of the filter.

The subject matter of the present invention is also very well suitable, when for purposes of maintaining an air cushion below the filter bottom, extension or immersion pipes are to be provided. In such an instance, the intermediate member may be equipped, for instance on the inside or outside, with ribs or gills. In this instance, the arrangement is such that the intermediate member will by means of its outer ribs or gills be clamped fast in the bore of the bottom while the inner ribs or gills of said intermediate member will connect together the nozzle shank and the immersion pipe. If desired, the nozzle may also consist of one piece with an extended shank of elastic material which protrudes below the filter bottom, said shank being clamped to the bottom by means of its outer ribs and additionally holding the immersion tube which is telescoped from below and may be broadened at this particular portion if so desired.

However, the upper end of the immersion pipe itself may be provided with outer ribs or gills and may by means of the latter be connected to the inner smooth passage of the nozzle or the nozzle shaft.

Structural Arrangement

Referring now to the drawing in detail, and FIG. 1 thereof in particular, the structure shown in FIG. 1 shows a filter nozzle having a nozzle head 1 and a nozzle shank 2 integral with said head 1. The outside of the shank 2 is provided with annular ribs or gills 3. As will be clearly evident from FIG. 1, the said gills or ribs are reinforced at the bottom side thereof adjacent the roots 4 whereby the resistance of said ribs or gills against the axial displacement in upward direction with regard to the drawing will be greater than against a downward movement. Shank 2 is pressed into bore 6 of the bottom 7 until the flange 5 abuts the bottom 7. In this way, as will be clear from FIG. 1, the annular ribs or gills 3 are clamped into the bore 6 of bottom 7 and thus will securely hold the nozzles in their desired position.

With the embodiment according to FIG. 2, nozzle head 1a and shank 2a which may be of customary shape, are made for instance of porcelain. As will also be evident from FIG. 2, a sleeve-like intermediate member 8 has been inserted into the bore 6 of the bottom 7. The outside of this intermediate member 8 is similar to shank 2 of FIG. 1, provided with annular ribs or gills 3 and has its inner side provided with corresponding ribs or gills 9. Shank 2a of the nozzle is pressed into the said intermediate member 8 and is held in its position by ribs 9 of the intermediate member 8. If the intermediate member 8 has a corresponding length as shown in FIG. 2, it may also support and hold an immersion pipe 10.

If desired, the intermediate member may be so designed that only the outside thereof will be provided with annular ribs or gills and extend on one hand into the bore of the filter bottom and on the other hand into a shankless nozzle head.

According to FIG. 3, the immersion pipe 10a itself is provided with annular ribs or gills 11 and is inserted into the passage for the nozzle shank 2b.

However, it is also possible to employ a construction in which outer ribs or gills are provided solely on the extended shank 2c of the nozzle as may be seen by reference to FIG. 4. To this end, the upper portion of the ribbed or gilled shank serves for securing the nozzle in the filter bottom, whereas the lower portion of the ribbed or gilled shank is employed for securing the immersion pipe 10c. In the last mentioned instance the immersion pipe end is preferably widened as at 12.

If desired, the upper ribbed or gilled portion may be omitted and the nozzle may be directly clamped against bottom 7 of the filter by means of the slipped-over immersion pipe.

It is also possible so to design the arrangement that the annular ribs or gills are arranged on the inside of the immersion pipe into which then will be inserted the smooth nozzle shank. In this instance, corresponding abutments would make it possible to secure the parts in their positions.

It is, of course, to be understood that the present invention is, by no means, limited to the particular constructions shown in the drawing but also comprises any modifications within the scope of the appended claims.

A particular advantage of the invention is seen in the fact that the heretofore necessary and relatively expensive threads in the filter bottom and on the nozzle shaft are not necessary any longer and that it is furthermore not any longer necessary to maintain fine machining tolerances for the said parts as well as for the clamping of the immersion pipes.

As shown in FIGS. 1, 2 and 3, the shank 2 of the filter nozzle 1 is lengthened, so that—when the nozzle is pressed in—at least one or two ribs 3 of the shank 2 stand out below the bottom and following insertion return into unbent condition.

Another important improvement of fitting the nozzles may be obtained, when the shank of the nozzles—or generally all of the parts provided with elastic ribs—are warmed up to a temperature considerably above operation-temperature of the filter, before the nozzles are installed. In this way the ribs will soften and make pressing in easy. After finishing the installation of the nozzle the ribs will reharden by cooling down; and separating will become practically impossible without destroying the nozzle.

What we claim is:

1. In a liquid filter provided with filter material and with a bottom supporting said filter material, said bottom having a plurality of substantially cylindrical bores extending therethrough, and a plurality of nozzles secured in said bores, each of said nozzles having a substantially cylindrical hollow shank extending into one of said bores, each of said nozzles having a flange at one end of said shank, the width of said flange being greater than that of said bore, said flange extending over said bore and abutting said bottom, and a nozzle head mounted on said flange, the improvement wherein each said shank is provided with a plurality of substantially annular ribs mounted on the periphery of said shank, said ribs being serially arranged in axially spaced relation to each other, said ribs being made of soft elastic material and being easily deformable, said ribs being relatively thick adjacent said shank, and therefrom tapering outward to relatively thin lips, said ribs being in bent frictional engagement with the wall of the respective bore of said filter bottom, the diameter of said ribs when in unbent condition being greater than the diameter of the respective bore receiving same, said shanks being longer than the thickness of said bottom whereby at least one rib of each shank is disposed on the outside of the respective bore in the bottom on the opposite side of the bottom from said nozzle.

2. The improvement according to claim 1 wherein said shanks are made of elastic material.

References Cited in the file of this patent

UNITED STATES PATENTS

| | | |
|---|---|---|
| 729,835 | Barnes et al. | June 2, 1903 |
| 1,577,539 | Polk | Mar. 23, 1926 |
| 2,155,964 | Bowers | Apr. 25, 1939 |
| 2,451,070 | Chamberlain | Oct. 12, 1948 |
| 2,886,203 | Goll | May 12, 1959 |

FOREIGN PATENTS

| | | |
|---|---|---|
| 1,036,457 | France | June 30, 1955 |